Aug. 14, 1934.  C. P. DUBBS  1,969,782
DISTILLING AND CONVERSION PROCESS
Original Filed Aug. 7, 1924  2 Sheets-Sheet 2

Inventor
Carbon P. Dubbs

Patented Aug. 14, 1934

1,969,782

UNITED STATES PATENT OFFICE 1,969,782

DISTILLING AND CONVERSION PROCESS

Carbon P. Dubbs, Wilmette, Ill., assignor to Universal Oil Products Company, Chicago, Ill., a corporation of South Dakota Application August 7, 1924, Serial No. 730,628
Renewed November 12, 1929

2 Claims. (Cl. 196—49)

Among the more salient objects of my invention are to provide a process and suitable apparatus for distilling and converting petroleums or other like substances into gasoline like products; to provide a process and suitable apparatus in which petroleums or other like substances can be first subjected to a continuous distillation and the distillate thereby produced be subjected to a continuous treatment for conversion to gasoline like products, each operation being simultaneously carried on to whatever extent desirable independent of the other operation; to provide a distilling and conversion process and suitable apparatus for continuously treating crude oil, whereby the said crude oil is first subject to a distilling and cracking temperature, the vapors from the same passed to a common dephlegmator or chamber in which the heavy ends are condensed and subjected to a further conversion action in a different part of the apparatus, and the vapors from this treatment passed back to the common dephlegmator or chamber and intermingled with the vapors generated from the first treatment, the heavy ends of such vapors being condensed and returned to the conversion part of the apparatus, while the remaining vapors are passed from said dephlegmator or chamber and condensed and collected separately; to provide a process and suitable apparatus for continuous treatment of petroleum or like substances, whereby they are first subjected to heating and more or less cracking temperature, then passed into a dephlegmator in which the light ends, that are either naturally contained in the petroleum or manufactured by the cracking, are passed off from said dephlegmator and condensed and collected separately, while the heavy ends are condensed in said dephlegmator and then passed through a separate heating coil and expansion chamber and from there passed into a second separate dephlegmator and that portion converted into gasoline like products condensed and collected separately while the heavier ends are condensed in said dephlegmator and are passed therefrom back to the second heating coil along with the condensate from the first dephlegmator. Many other advantageous, new and novel features of this process and apparatus will be apparent to those versed in the art, and all of which features I claim in my process.

While I have shown apparatus suitable for carrying on my process, it will be understood that this apparatus can be modified in various ways and still be suitable for carrying out my process.

To illustrate, it is well understood in the art that petroleum is made up practically of hydrogen and carbon. The lighter portions or those having the lowest boiling points are the simpler grouping of the hydrocarbons, that is, these molecules contain less carbon and hydrogen than do the heavier portions. For instance, the molecules forming the so called gasoline portion of the oil contains less hydrogen and carbon than do the molecules forming the kerosene; likewise, the molecules forming the kerosene portion contain less hydrogen and carbon than do the molecules forming the portion of the oil known as gas oil; and the molecules of the latter, in turn, contain less hydrogen and carbon than do the molecules forming the fuel oil or residue. While I can not say to a certainty, yet I am led to believe that in cracking petroleum with heat and pressure to convert higher into lower boiling point oils, the higher the amount of carbon and hydrogen forming the molecules of the oil, when cracked under heat and pressure into lower boiling point oils, the larger the amount of free carbon that will be formed. Whatever the true chemical reaction may be, I do know from the experience of cracking thousands of barrels of oil that when I subject a given amount of kerosene to heat and pressure and convert a given amount into an oil having a definite lower boiling point, I produce less free carbon than when treating a similar amount of oil of a higher boiling point, to produce the same range and quantity of low boiling point product. For instance, subjecting first 100 barrels of kerosene to heat and pressure and producing therefrom 50 barrels of gasoline having an end point of 437° F., and then similarly treating a like quantity of gas oil and producing therefrom 50 barrels of a like quality of gasoline, then similarly treating a like quantity of fuel oil and producing therefrom 50 barrels of a like quality of gasoline, I will produce the greatest amount of free carbon from the 100 barrels of fuel oil, and a lesser amount of free carbon from the 100 barrels of gas oil, and a still lesser amount of free carbon from the 100 barrels of kerosene. I give the above as a general illustration, and this applies not only to the different kinds of petroleum, but to the different crude oils themselves. For the above reason, it will be readily seen than the yield of free carbon to gasoline produced will be more when produced from the heavier portion of the oil than when produced from the lighter portion of the oil. Further, if the cracking or conversion operation is arrested so that there will be a liquid residue, such liquid residue will contain so much free carbon that it will make it objectionable for use as commercial fuel. For these reasons, it is of great economical value in treating petroleum and converting the same into lower boiling point products, that if the heavier ends are removed during this operation and only the lighter ends cracked into lower boiling points, a greater quantity of oil could be treated before being compelled to shut down on account of accumulation of free carbon in the apparatus. The heavy ends thus removed, as described in my process, will be practically free from carbon, and they are a very superior fuel. Or these heavy ends may be subjected to a dry distillation in an ordinary well known apparatus used for such purposes and the distillate thus obtained subjected to a further cracking in the manner I have described. If it is desirable to make high quality lubricating oils, then the heavy ends of the petroleum that are withdrawn from the cracking plant are very superior raw material for making these lubricating oils by subjecting them to any of the well known methods.

Now, in my process I propose taking an actual crude oil, or topped oil, or even fuel oil or mixtures thereof, or other like substances, and first separating out therefrom the heavy ends, merely cracking such heavy ends to give them sufficient low viscosity, and then subject the balance of the oil to cracking and convert such portion of it as is desirable into gasoline like products, all in one continuous operation. This will be better understood by referring to the attached drawings.

Figs. 1 and 2 show a general plan of suitable apparatus and are not drawn to scale nor parts proportioned, one to the other. One skilled in the art will known how to proportion the different parts, one to the other, that will be best suited to his particular need.

Figure 1:
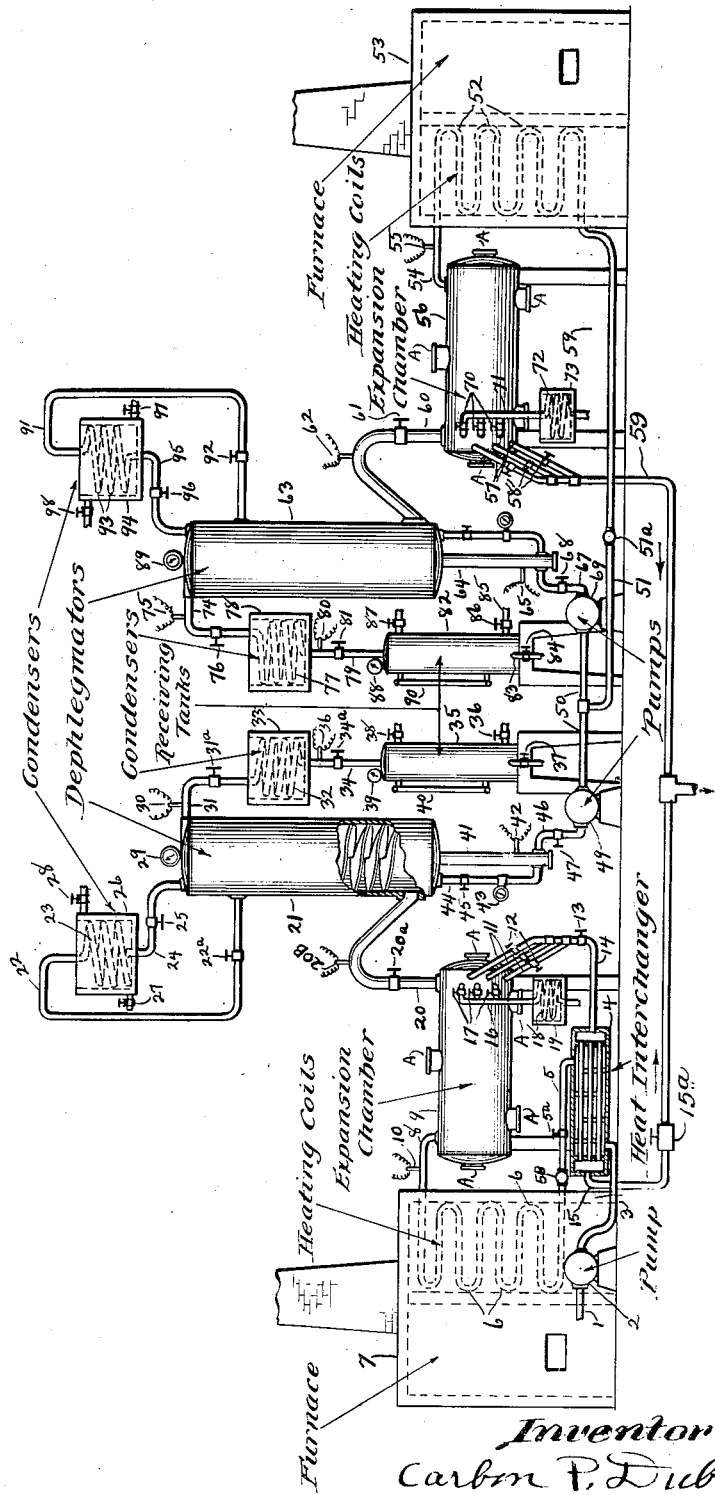
Fig. 1 represents a suitable apparatus in side elevation, with sections of parts broken away to show the interior construction.

Referring to Fig. 1 and describing the operation, the raw material to be treated is drawn from sources not shown, through line 1, through pump 2, through line 3, into heat interchanger 4, which heat interchanger may be of any suitable design, and is discharged from this heat interchanger through line 5, through valve 5—a and check valve 5—B, into heating coils 6, positioned in furnace 7. Any suitable furnace and arrangement of heating coils can be used. From heating coils 6 the material passes through line 8 into expansion chamber 9, which may be of any suitable design, and which chamber as well as line 8 are preferably heavily insulated. The temperature of the oil as taken at pyrometer 10 may be from 600 to 1,000 degrees, according to the pressure used, which may be from atmospheric or less up to 2,000 pounds. The unvaporized portion of the oils, as well as any solid matter, are separated, in the chamber 9, from the vaporized portion, and the unvaporized liquid portion is drawn off through lines 11, controlled by valves 12 and 13, and through line 14 into heat interchanger 4, and as same passes therethrough it is cooled by the raw oil supplied to this heat interchanger, which raw oil in turn is given a preliminary heating. The cooled residue then passes through line 15, through valve 15—a, to any suitable storage not shown, or this residue may be drawn hot from the apparatus and passed to any suitable well known coking equipment, and there distilled down to coke, and the distillate thus obtained subjected to a further cracking under pressure. The liquid level in the expansion chamber 9 is ascertained by trycocks 17 connected to manifold 16, which manifold connects to condensing coil 18, positioned in water tank 19. The vapors pass through line 20, through valve 20—a, past pyrometer 20—B into the lower part of dephlegmator 21. The upright portion of line 20 is heavily lagged to prevent condensation, and the rest of the line and dephlegmator may also be lagged and its temperature controlled by the reflux condensate, rather than to depend upon atmospheric cooling. These dephlegmators may be of any suitable design, and the one I have shown consists of a spiral forcing the vapors to travel around this spiral in an upward direction and the condensate to flow down. In this way the condensate as it flows down comes in contact with increasingly hot vapors and thus the light ends in the same are re-evaporated out and in turn the heavy portions of the vapors traveling upward are condensed and refluxed back. This condensing can be accomplished by the cooling of the dephlegmator by radiation, but it may be better controlled by taking a portion of these vapors from part way up the dephlegmator as shown in line 22, passing through valve 22—a into condensing coils 23, positioned in condensing tank 26, and passing the condensate through line 24, through valve 25 into the top of the dephlegmator 21, the amount being condensed being controlled by the valve 22—a or 25 or by the amount of water supplied to condensing tank 26, through valve 27 and discharged through valve 28. The pressure on the apparatus up to this point is indicated by pressure gauge 29 on top of the dephlegmator and the quality of the vapors passing from the dephlegmator 21 are controlled by the temperature as indicated by pyrometer 30 in line 31, the vapors passing through line 31, through valve 31—a, into condensing coil 32, positioned in water condensing tank 33, and from there flow through line 34, through valve 34—a, into receiving tank 35. In line 34 is temperature pyrometer 36. The liquids are withdrawn from tank 35 through valves 36 and 37 and the uncondensable gas through valve 38 and the pressure on the apparatus controlled by regulation of this valve 38, this pressure being indicated by pressure gauge 39, and the receiving tank 35 has a liquid level gauge 40 which may be of any suitable design. The condensate in the dephlegmator 21 flows through line 41 and its temperature is indicated by pyrometer 42, and the height of this liquid is shown by differential gauge 43 positioned in line 44, having valve 45. The oil flows from this dephlegmator leg 41 through line 46, through valve 47 into pump 49 and is discharged into manifold 50, into line 51, through check valve 51—a, into heating coils 52 positioned in furnace 53, which heating coils and furnace may be of any suitable design. The oil then passes through line 54, its temperature being indicated by pyrometer 55, and this temperature may be from 600 to 1200 degrees according to the pressure used, which may range from 5 pounds to 2,000 pounds, and these, of course, will be governed by the amount of conversion desired of the oil into gasoline like products in each passage through the heating coils 52. To illustrate what I means by this, it is a well established fact that in the use of relatively low temperatures and pressures a lower percentage of the oil as it passes through these heating coils is converted into gasoline like products and without any substantial deposit of carbon in the heating coils. The total percentage of the oil finally converted into gasoline like products is dependent upon the insufficiently cracked fractions being repeatedly returned and passed through these heating coils 52. By using a little higher temperature and considerably higher pressure a greater amount of the oil in each single pass through these tubes can be converted into gasoline without there being an appreciable amount of carbon deposited in these heating tubes. I can not lay down precise rules to govern this, for the reason that it is different for different oils and different cuts of the same oil, but those versed in the art will readily understand the underlying principle and take advantage of it. For illustration, if I am running through the coils 52 an oil similar to gas oil of about 32 to 34 gravity, and operating at about 150 pounds pressure, 2 or 3 per cent of the oil can be cracked as it passes through the heating coils 52 by heating the same to about 830 to 860 Fahrenheit, and as it passes through the expansion chamber 56 a further proportion of the oil will be cracked or converted into gasoline like products, the total conversion being about 10 per cent and very little carbon will deposit in said heating coils. Now, if I raise this pressure to around 800 pounds to the square inch it will be found that as the oil passes once through the coils 52 and expansion chamber 56, as much as 30 to 35 per cent of it can be cracked or converted into gasoline like products without depositing an excessive amount of carbon in the heating coils 52, and the temperature of the oil as it leaves the heating coils 52 will be around about 850 Fahrenheit. With kerosene about 40 per cent can be cracked or converted into gasoline like products by passing it once through the heating coils 52 and expansion chamber 56 by using around 800 pounds pressure. Therefore it will be seen that the higher the pressure the lower the number of times the uncracked portion of the oil will have to be passed through the heating coils and expansion chamber to obtain therefrom a large yield of gasoline like products without depositing an undue amount of carbon in the heating tubes. Each refiner will have his choice as to what he deems is the most economical pressure, etc., to use. It will be appreciated by those skilled in the art that the velocity at which the oil passes through coils 52 has more or less effect in preventing carbon from depositing therein; but I am led to believe that the velocity has not so much to do with this as has the controlling of the percentage of oil that is cracked or converted into gasoline in each single pass through the heating tubes at the pressure used. The oil passes from line 54 into expansion chamber 56, which expansion chamber and line 54 is heavily lagged to prevent loss of heat. Any unvaporized portion is drawn off through lines 57, through valves 58, through line 59, to any suitable storage not shown, and in such case the oil should be cooled and any well known make of cooler can be used therefor. I have not shown such a cooler. The liquid residue withdrawn through the line 59 may be united with the liquid residue withdrawn through line 15 and the commingled residues collected as a suitable fuel. Or the oil may be used hot for fuel in the plant. If desired, the plant may be operated so as to have no liquid residue in expansion chamber 56, the volatile part of the oil being converted into vapors and the carbon formed being precipitated in chamber 56. The vapors pass through line 60, through valve 61, past temperature pyrometer 62, into the lower part of the dephlegmator 63. This dephlegmator may be of any suitable design, and in the drawings is supposed to be like dephlegmator 21. The vapors as they pass up through this dephlegmator are cooled and the unconverted portions are condensed and refluxed back through line 64 past temperature pyrometer 65, through line 67, through valve 68, into pump 69, into manifold 50, and into line 51, through check valve 51—a, and back through heating coils 52 and so on as already described. The liquid level in the expansion chamber 56 is ascertained by valves 70 which connect to header 71, which connects to condensing coil 72 positioned in condenser 73. The remaining vapors in the dephlegmator 63 pass through line 74, past temperature pyrometer 75, through valve 76, into condensing coils 77, positioned in water tank 78, through line 79, past temperature pyrometer 80, through valve 81 into receiving tank 82. The liquids are drawn through line 83, controlled by valve 84, and through line 85, controlled by valve 86. The uncondensable gas is passed off through valve 87 and the pressure on the apparatus controlled by this valve, and the pressure indicated by pressure gauge 88, and the dephlegmator also has the pressure gauge 89. The receiving tank 82 has a liquid gauge 90 which may be of any suitable design. The temperature of the dephlegmator 63 can be controlled by taking off a proportion of the vapors part way down the dephlegmator through line 91, through valve 92, and condensing such vapors in condensing coils 93, positioned in condensing tank 94, and passing this condensate through line 95, through valve 96, back into the top of the dephlegmator 63. Water is supplied to the condensing tank 94 through valve 97, and is discharged through valve 98. The temperature of the vapors leaving the dephlegmator 21, through line 31, and dephlegmator 63, through line 74, will be varied according to the material desired, the temperature usually being from 437 degrees F. to about 600 degrees F.

It will be readily seen that one can, by this process, take an oil and by passing it through the heating coils 6 and expansion chamber 9 vaporize such proportion of the lighter ends from such oil as may be desired and independently subject these lighter ends to cracking, and the unvaporized heavy ends which are the molecules made up of large amounts of hydrogen and carbon may be withdrawn from the process and be used as a very superior commercial fuel. This all being done as one continuous operation, it will also be observed that if one chooses in treating crude oil he can take off from the top of the dephlegmator 21 the gasoline naturally contained in the crude oil and collect it separately and subject the rest of the vapors to a cracking operation and collect the cracked portion separately, and it will be observed that these two operations can be maintained at different pressures and temperatures, and one skilled in the art will know the enormous advantage of this and how to use same.

There will be other occasions when it will be desirable to convert all except the heavy ends of the oil into gasoline, and when using crude oil containing natural gasoline to leave such natural gasoline mixed with the portion of the oil that is cracked into gasoline, and in this case there is only one dephlegmator used and the whole may be operated under one uniform pressure.

Figure 2:
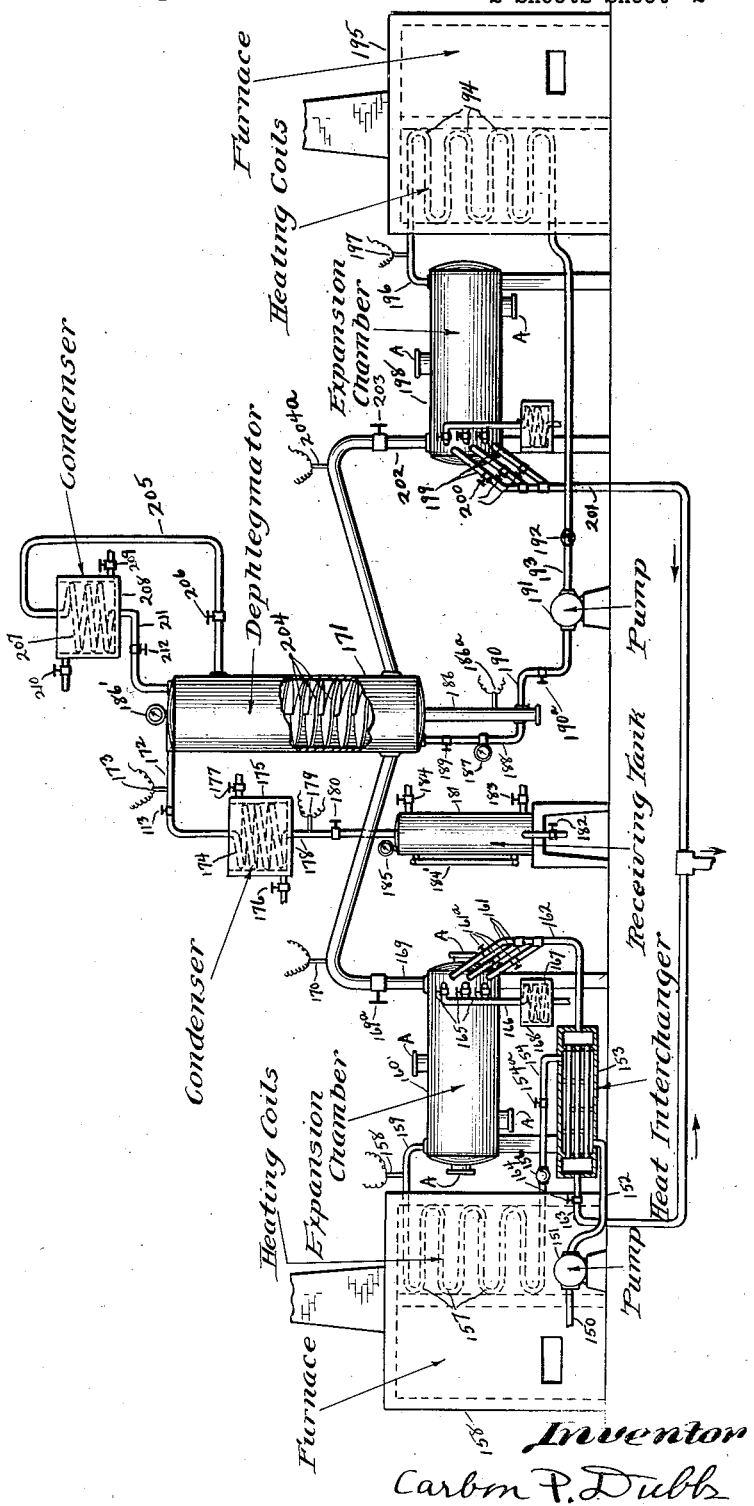
Fig. 2 represents another apparatus for carrying on the same process, and is shown in side elevation, with sections or parts broken away to show the interior arrangement.

Fig. 2 shows a suitable apparatus for carrying on this latter operation, and to describe the operation the raw oil is drawn from a source not shown, through line 150, through pump 151, through line 152, through heat interchanger 153, which may be of any suitable design, and then through line 154, through valve 154—a, through check valve 156, into heating coils 157, positioned in furnace 158, which heating coils and furnace may be of any suitable design. The oil as it passes through the heating coils is heated to the desired temperature and according to the pressure used and the amount to be vaporized of the particular oil being used. This temperature may be from 600 to 1,000 degrees Fahrenheit and from 5 to 2,000 pounds pressure per square inch. The temperature of the oil is indicated by pyrometer 158, positioned in line 159, through which the oil from the heating coils 157 flows and passes into expansion chamber 160. The liquid residue from expansion chamber 160 is drawn off through lines 161, through valves 161—a, through line 162, through heat interchanger 153, which oil is cooled by the cold raw oil flowing through said heat interchanger, and which latter, in turn, is preheated. This liquid residue flows out through line 163, through valve 164. The liquid residue in expansion chamber 160 may be withdrawn therefrom hot and run to any suitable, well known coking apparatus and therein distilled to dry coke, and the distillate thus produced subjected to further cracking in my process. The level in the expansion chamber 160 is ascertained by try-cocks 165, connected to header 166, which header connects to condensing coil 167 positioned in cooling tank 168. The vapors pass through vapor line 169, through valve 169—a, past temperature pyrometer 170 into the lower part of dephlegmator 171, which dephlegmator may be of any suitable design, the object of the dephlegmator being to condense out the unconverted portions and allow the converted portions to pass from the top of the dephlegmator through line 172, past temperature pyrometer 173, through valve 113, into condensing coils 174, positioned in tank 175, which tank is supplied with water through valve 176 the water being discharged through valve 177. The condensate passes through line 178, past pyrometer 179, through valve 180, into receiving tank 181. The liquid condensates are drawn off through valves 182 and 183, and the uncondensable gas through valve 184, which valve is used for controlling the pressure on the apparatus. Receiving tank 181 has liquid level gauge 184' which may be of any suitable design and pressure gauge 185, and the dephlegmator 171 is provided with pressure gauge 186'. The condensate in the dephlegmator 171 passes through line 186, having pyrometer 186—a, and the liquid level in this line 186 is indicated by differential gauge 187 positioned on line 188, which has valve 189. From leg 186 the condensate passes through line 190, through valve 190—a, into pump 191, then through line 193, through check valve 192, into heating coils 194, positioned in furnace 195, which furnace and heating coils may be of any suitable design. The oil then passes through line 196, past temperature pyrometer 197, into expansion chamber 198. The temperature of the oil as it passes from the heating coils 194 will vary according to the material being treated, the percentage of conversion and the pressure used, and this temperature will range from 600 to 1200 degrees Fahrenheit and the pressure from 5 to 2,000 pounds per square inch. Any liquid residue in expansion chamber 198 may be drawn off through lines 199, controlled by valves 200, through line 201, to any suitable storage not shown, or disposed of otherwise. If it is desired to cool this, any well known make of cooling coil can be used, and it is not deemed necessary that such cooling coils be shown in the drawings. The liquid residues in this instance may, as in the first operation, be united with the residue withdrawn through line 163 and the commingled residues collected as a fuel. If desired the plant can be so operated that there will be no liquid residue in chamber 198, and all of the volatile part of the oil will be vaporized. The expansion chamber 198 is heavily lagged, as well as the upright portion of pipe 202. The vapors pass through line 202, through valve 203, past temperature pyrometer 204a, into the lower portion of dephlegmator 171, and pass up around spirals 204, and in doing so the heavy ends are condensed and pass down through leg 186, through line 190, pump 191, and into and through heating coils 194 as already described. If preferable, the dephlegmators can be elevated to such height as to give sufficient hydrostatic head to force the oil back through the heating coils 194 without the use of pumps. The remaining vapors pass up through the dephlegmator and out through line 172, through condensing coil 174, etc., as previously described. The temperature of the vapors as they leave the dephlegmator can be controlled by taking off vapors from part way down the dephlegmator through line 205, controlled by valve 206, and condensing them in coils 207, positioned in the tank 208, which is supplied with water through valve 209, which water is discharged through valve 210. The condensed vapors pass through line 211, through valve 212, back to the top of the dephlegmator 171. If desirable, the pressure on the apparatus can be controlled at valve 113 and the rest of the apparatus, that is the condensing coils 174 and receiving tank 181, can be carried at a reduced or atmospheric pressure. In Fig. 1 the pressure can be controlled at valve 31—a and a reduced or atmospheric pressure maintained on condensing coils 32 and receiving drum 35 by valve 38 and the pressure controlled by valve 76 and a reduced or atmospheric pressure maintained in condensing coil 77 and in receiver 82 by means of valve 87. "A" are manholes on expansion chambers 9, 56, 160 and 198, and are used for cleaning said expansion chambers, and there may be as many or few as one may choose. While I have shown a certain type of expansion chamber, it will be understood that any suitable design or number may be used.

In the construction of the heating coils 6, 52, 157 and 194, one skilled in the art will know how to provide for cleaning same, and such suitable detail designs are well known, hence I have not deemed it necessary to show such details.

I claim:

1. A process for converting hydrocarbon oils, comprising subjecting the oil to an initial cracking treatment just adequate to produce a residue of low viscosity, subjecting vapors evolved from the oil as a result of such initial cracking treatment to reflux condensation, separately subjecting the reflux condensate to an independent secondary cracking treatment, without permitting commingling of the reflux condensate with the oil undergoing said initial cracking treatment, separately removing the unvaporized oil residue produced in the initial cracking treatment and the unvaporized residue produced in said secondary cracking treatment, and uniting such residues to form a fuel of low viscosity, substantially free from objectionable solids.

2. A method for producing gasoline-like hydrocarbons and a low viscosity fuel oil from heavy hydrocarbon oil which if subjected in its entirety to drastic cracking conditions would form copious quantities of carbon, comprising initially subjecting such heavy hydrocarbon oil to conditions of temperature and pressure in an initial zone just adequate to reduce the viscosity of the heavy ends of the oil without carbon formation and to liberate the light and intermediate fractions of the heavy oil, removing the low viscosity heavy ends as a liquid residue without subjection thereof to further cracking treatment, removing said light and intermediate fractions, separating the light from the intermediate fractions, subjecting the intermediate fractions in an independent zone to drastic cracking conditions such as to convert substantial portions of the intermediate fractions into gasoline-like hydrocarbons, removing the vapors from said independent zone and subjecting the same to dephlegmation to condense insufficiently cracked products heavier than gasoline as a reflux condensate, subjecting the gasoline-like vapors to final condensation to form the distillate product of the process, removing the unvaporized residue from said independent cracking zone and combining the same with the carbon-free low viscosity liquid oil removed from said initial zone to form the low viscosity fuel oil product of the process.

CARBON P. DUBBS.